(12) United States Patent
Shen et al.

(10) Patent No.: US 8,079,135 B1
(45) Date of Patent: Dec. 20, 2011

(54) METHOD FOR PROVIDING A PERPENDICULAR MAGNETIC RECORDING (PMR) TRANSDUCER

(75) Inventors: Yong Shen, Saratoga, CA (US); Liubo Hong, San Jose, CA (US); Guanghong Luo, Fremont, CA (US); Honglin Zhu, Fremont, CA (US); Lei Wang, Fremont, CA (US); Yingjian Chen, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 919 days.

(21) Appl. No.: 11/955,667

(22) Filed: Dec. 13, 2007

(51) Int. Cl.
*G11B 5/127* (2006.01)
*H04R 31/00* (2006.01)

(52) U.S. Cl. .............. 29/603.16; 29/603.11; 29/603.13; 29/603.14; 29/603.15; 29/603.18; 216/62; 216/65; 216/66; 360/121; 360/122; 360/317; 451/5; 451/41

(58) Field of Classification Search ............... 29/603.11, 29/603.13–603.16, 603.18; 360/121, 122, 360/317; 451/5, 41
See application file for complete search history.

(56) References Cited

U.S. PATENT DOCUMENTS

| | | | |
|---|---|---|---|
| 6,195,229 B1 | 2/2001 | Shen et al. | |
| 6,306,311 B1 | 10/2001 | Han et al. | |
| 6,329,211 B1 | 12/2001 | Terunuma et al. | |
| 6,583,966 B2 | 6/2003 | Han et al. | |
| 6,722,018 B2 | 4/2004 | Santini | |
| 6,870,712 B2 | 3/2005 | Chen et al. | |
| 6,949,833 B2 | 9/2005 | O'Kane et al. | |
| 6,975,486 B2 | 12/2005 | Chen et al. | |
| 7,002,778 B2 * | 2/2006 | Yazawa | 360/125.42 |
| 7,024,756 B2 | 4/2006 | Le et al. | |
| 7,070,698 B2 | 7/2006 | Le | |
| 7,139,153 B2 | 11/2006 | Hsiao et al. | |
| 2004/0070876 A1 * | 4/2004 | Yazawa | 360/126 |
| 2005/0024779 A1 | 2/2005 | Le et al. | |
| 2005/0225898 A1 | 10/2005 | Huang et al. | |
| 2005/0264931 A1 | 12/2005 | McFadyen | |
| 2006/0000795 A1 | 1/2006 | Chen et al. | |
| 2006/0044681 A1 | 3/2006 | Le et al. | |
| 2006/0044682 A1 | 3/2006 | Le et al. | |
| 2006/0102956 A1 | 5/2006 | Kamarajugadda et al. | |
| 2006/0198049 A1 | 9/2006 | Sasaki et al. | |
| 2006/0231523 A1 | 10/2006 | Baer et al. | |
| 2006/0245109 A1 | 11/2006 | Hsu et al. | |
| 2006/0288565 A1 | 12/2006 | Le et al. | |
| 2007/0035878 A1 | 2/2007 | Guthrie et al. | |
| 2007/0115584 A1 | 5/2007 | Balamane et al. | |
| 2007/0139816 A1 | 6/2007 | Chen et al. | |
| 2007/0211384 A1 | 9/2007 | Hsiao et al. | |
| 2007/0217069 A1 * | 9/2007 | Okada et al. | 360/126 |
| 2007/0230046 A1 | 10/2007 | Le et al. | |

(Continued)

*Primary Examiner* — Paul D Kim

(57) ABSTRACT

A method for providing a perpendicular magnetic recording (PMR) transducer is described. The PMR transducer provided includes a PMR pole and yoke structure coupled with the PMR pole. The method includes providing a hard mask and an intermediate layer. A first portion of the hard mask resides on the PMR pole. A second portion of the hard mask resides on another structure. The intermediate layer surrounds at least the PMR pole. The method also includes performing a planarization on at least the intermediate layer, removing the first portion of the hard mask on the PMR pole without completely removing the second portion of the hard mask on the other structure. The method further includes removing a remaining portion of the hard mask on the other structure, providing a write gap on the PMR pole, and providing a shield on the write gap.

15 Claims, 12 Drawing Sheets

U.S. PATENT DOCUMENTS

2007/0245545 A1* 10/2007 Pentek et al. .............. 29/603.13
2007/0258167 A1   11/2007 Allen et al.
2007/0268625 A1   11/2007 Jiang et al.
2008/0037168 A1*  2/2008 Freitag et al. ................ 360/122

* cited by examiner

US 8,079,135 B1

METHOD FOR PROVIDING A PERPENDICULAR MAGNETIC RECORDING (PMR) TRANSDUCER

BACKGROUND

Conventional perpendicular magnetic recording (PMR) heads can be fabricated in a number of ways. FIG. 1 is a flow chart depicting a conventional method 10 for fabricating a PMR transducer using a conventional process. For simplicity, some steps are omitted. FIGS. 2-7 are diagrams a depicting conventional PMR transducer 50 as viewed from the air-bearing surface (ABS) during fabrication. The conventional PMR transducer 50 may be part of a coupled with a slider to form a PMR head. In addition, a read transducer (not shown) may be included to form a merged PMR head. For simplicity, only a portion of the conventional PMR transducer 50 is shown. The conventional method 10 is described in the context of the conventional PMR transducer 50.

The PMR pole layers and chemical mechanical planarization (CMP) stop layer are provided, via step 12. The PMR pole layers may include a seed layer and one or more layers forming the magnetic portion of the PMR pole. A hard mask is provided on the CMP stop layer, via step 14. The hard mask covers a portion of the PMR pole layers from which the conventional PMR pole is to be formed. FIG. 2 depicts the conventional PMR transducer 50 after step 14 is completed. Thus, the conventional PMR transducer 50 an underlayer 52 on which the PMR pole layer(s) 54 reside. A CMP stop layer 56 resides on the PMR pole layers 54. The hard mask 58 resides on a portion of the CMP stop layer 56 and PMR pole layers 54. The hard mask 58 may also reside on other portions (not shown) of the conventional PMR transducer 50. For example, during fabrication, the conventional PMR transducer 50 typically includes an anchor structure during fabrication as well as a yoke structure that is part of the conventional PMR transducer 50. The underlayer 52 may include aluminum oxide or other nonmagnetic material. The PMR pole layer(s) 54 include magnetic materials suitable for use in the conventional PMR transducer 50. The CMP stop layer 56 may include materials, such as diamond-like carbon (DLC), having a low removal rate for during a CMP. The hard mask 58 may include materials such as NiFe.

The conventional PMR pole is defined from the PMR pole layers 54, via step 16. Step 16 typically includes performing an ion mill and a pole trim using the hard mask 56 to expose the portion of the PMR pole layer(s) to be removed. FIG. 3 depicts the conventional PMR transducer 50 after step 16 is completed. Thus, the conventional PMR pole 54' has been formed. In addition, only a portion of the CMP stop layer 56' remains.

A conventional intermediate layer is provided, via step 18. The conventional intermediate layer is typically aluminum oxide that is blanket deposited on the conventional PMR transducer 50. FIG. 4 depicts the conventional PMR transducer 50 after step 18 has been performed. Thus, the conventional intermediate layer 60 has been formed. The conventional intermediate layer 60 covers the conventional PMR pole 54', the CMP stop layer 56', and the hard mask 58.

A CMP is performed to completely remove the hard mask 58, via step 20. Step 20 is configured to remove the hard mask 58 from substantially all of the structures on which the hard mask 58 resides. Thus, the hard mask 58 is substantially removed from the conventional PMR pole 54' as well as other structures, such as the yoke (not shown) and anchor structures. FIG. 5 depicts the conventional PMR transducer 50 after step 20 is performed. Thus, a substantially planar surface formed by the top of the intermediate layer 60' and the CMP stop layer 56'.

The CMP stop layer 56' is removed, via step 22. FIG. 6 depicts the conventional PMR transducer 50 after step 22 is performed. Thus, the top surface is formed by portions of the intermediate layer 60' and the conventional PMR pole 54'. A write gap is deposited on the PMR transducer 50 and a shield is provided, via steps 24 and 26, respectively. FIG. 7 depicts the conventional PMR transducer 50 after step 26 is performed. Thus, the write gap 62 and trailing shield 64 are shown. Also shown is a notch 63 in the shield 64 due to the topology of the conventional PMR transducer 50.

Although the conventional method 10 may provide the conventional PMR transducer 50, there may be drawbacks. In particular, as the critical dimensions of structures in the conventional PMR transducer 50 shrink to accommodate higher densities, tighter control may be desired for the structures in the conventional PMR transducer 50. Conventional methods, including the conventional method 10, may not provide the desired control over at least some portions of the conventional PMR transducer 50.

For example, some methods for forming the conventional PMR transducer 50 result in the top surface of the intermediate layer 60' being at the same height as the top of the conventional PMR pole 54'. Such conventional methods may include those in which the conventional PMR pole 54' is deposited into a trench rather than being defined by a milling process. In such a case, the notch 64 may be nonexistent. The method 10 may also be somewhat uncontrolled. For example, in some cases, removal of the hard mask 58 in step 20 removes a greater portion of the intermediate layer 60. FIGS. 8-9 depict a conventional PMR transducer 50' in which this has occurred. The conventional PMR transducer 50' is analogous to the conventional PMR transducer 50 and may be formed using the conventional method 10. Thus, the conventional PMR transducer 50' includes underlayer 52', conventional PMR pole 54'', intermediate layer 60'', and CMP stop layer 66''. Because a greater portion of the intermediate layer 60'' has been removed, the top surface of the intermediate layer 60'' is lower than the top of the conventional PMR pole 54''. Moreover, a portion of the PMR pole 54'' may be inadvertently removed. Thus, when the write gap 62' and top shield 64' are provided in steps 24 and 26, the notch 63' is in the opposite direction from the notch 63. Consequently, conventional methods for fabricating the conventional PMR transducer 50 may result in a notch 63, no notch, or a notch 63' in the reverse direction. Conventional methods for fabricating the conventional PMR transducer 50 may thus have relatively large variations in the conventional PMR transducer 50. Consequently, performance of the conventional PMR transducer 50/50' may vary even when the same method 10 is used for fabricating the conventional PMR transducer 50/50'

Accordingly, what is needed is an improved method for fabricating a PMR transducer.

SUMMARY

A method and system for providing a perpendicular magnetic recording (PMR) transducer are disclosed. The PMR transducer includes a PMR pole and a yoke structure coupled with the PMR pole. The method and system include providing a hard mask and an intermediate layer. A first portion of the hard mask resides on the PMR pole. A second portion of the hard mask resides on another structure. The intermediate layer surrounds at least the PMR pole. The method and system also include performing a planarization on at least the intermediate layer to remove the first portion of the hard mask on the PMR pole without completely removing the second portion of the hard mask on the other structure. The method and system further include removing a remaining portion of the hard mask on the other structure, providing a write gap on the PMR pole, and providing a shield on the write gap.

DETAILED DESCRIPTION OF THE PREFERRED EMBODIMENTS

Figure 1:
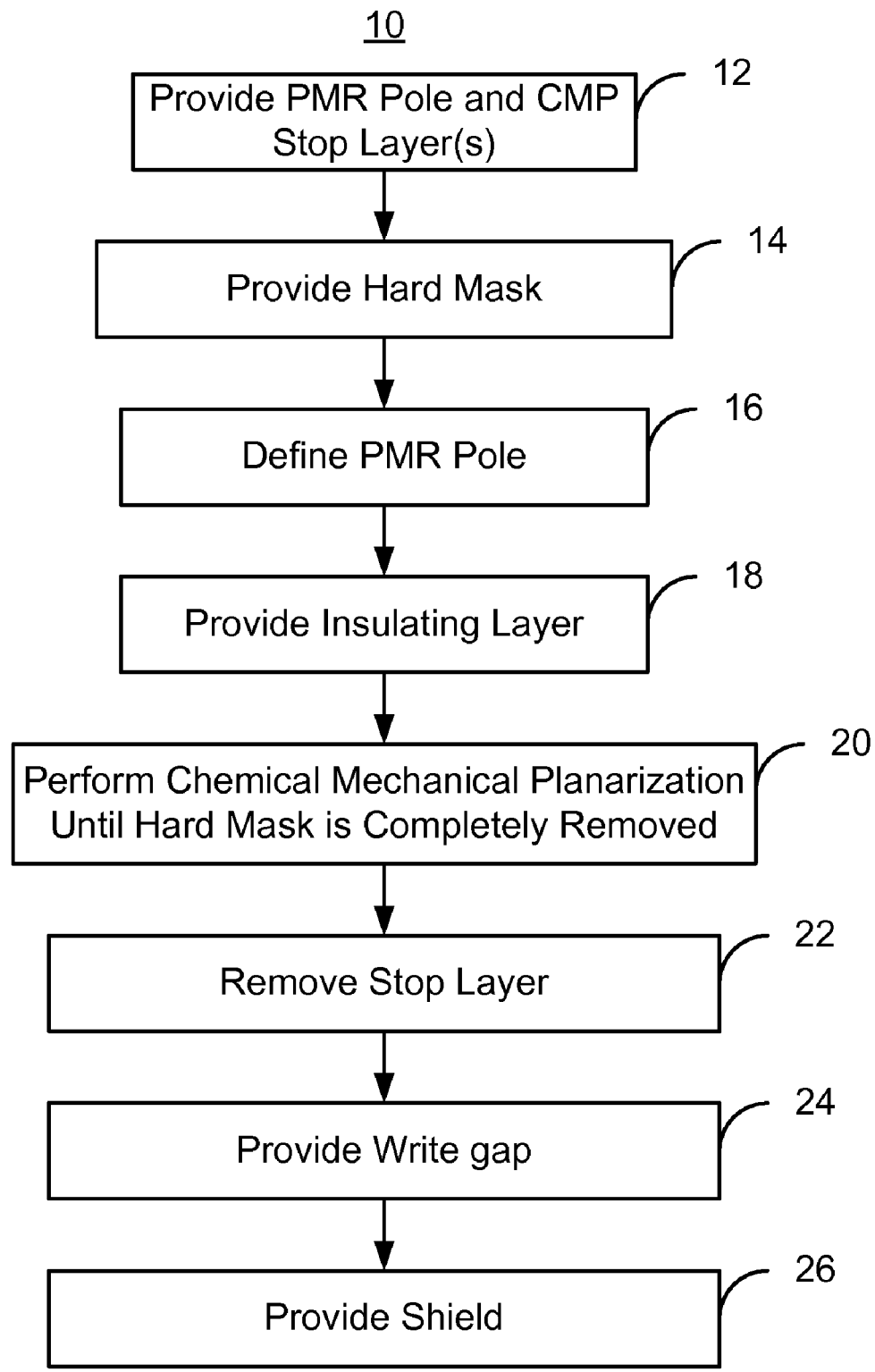
FIG. 1 is a flow chart depicting a conventional method for fabricating a PMR head.
Figure 2:
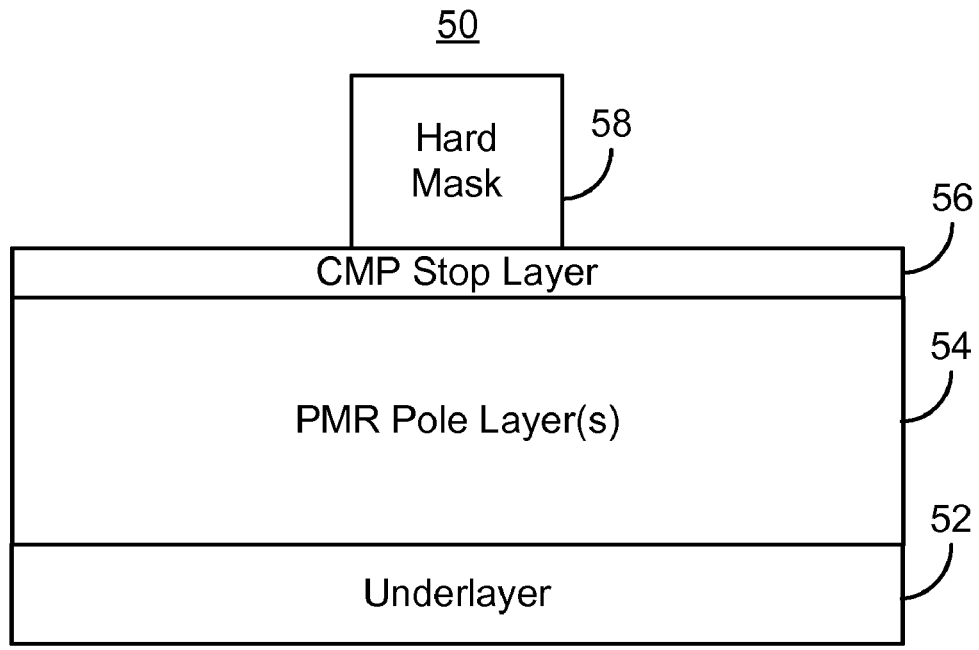
FIGS. 2-7 are diagrams depicting conventional PMR transducers during fabrication.
Figure 3:
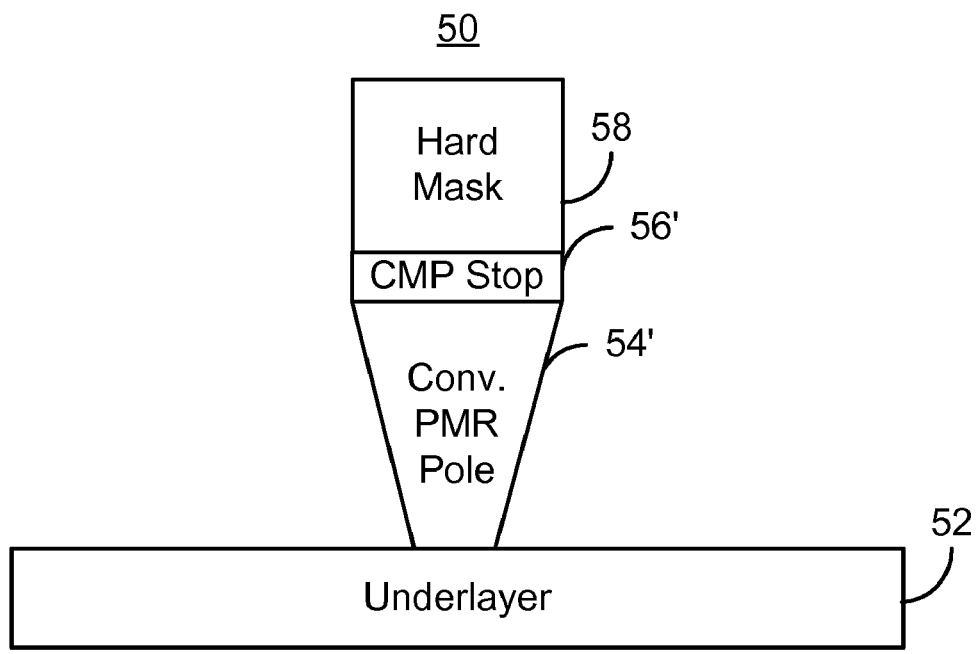
Figure 4:
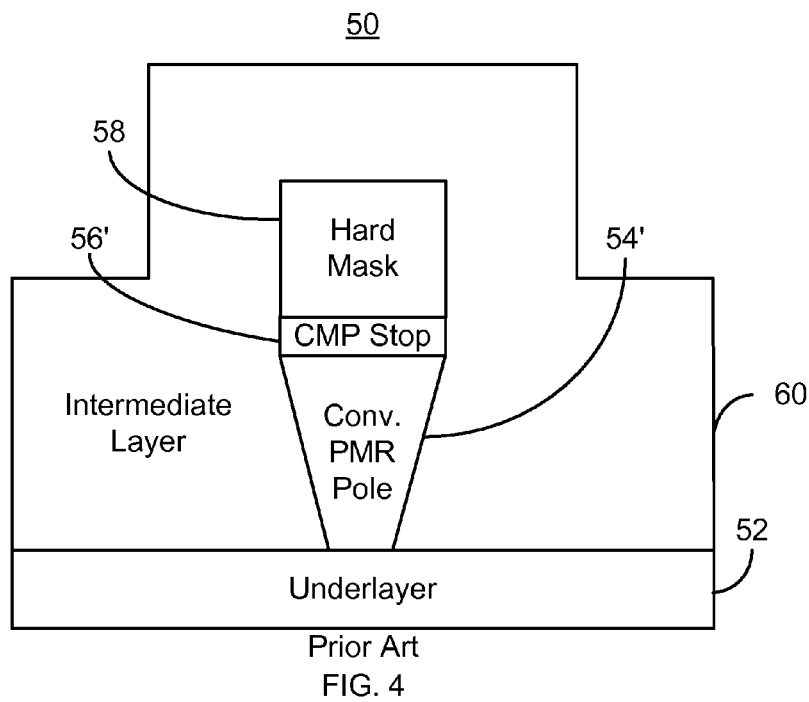
Figure 5:
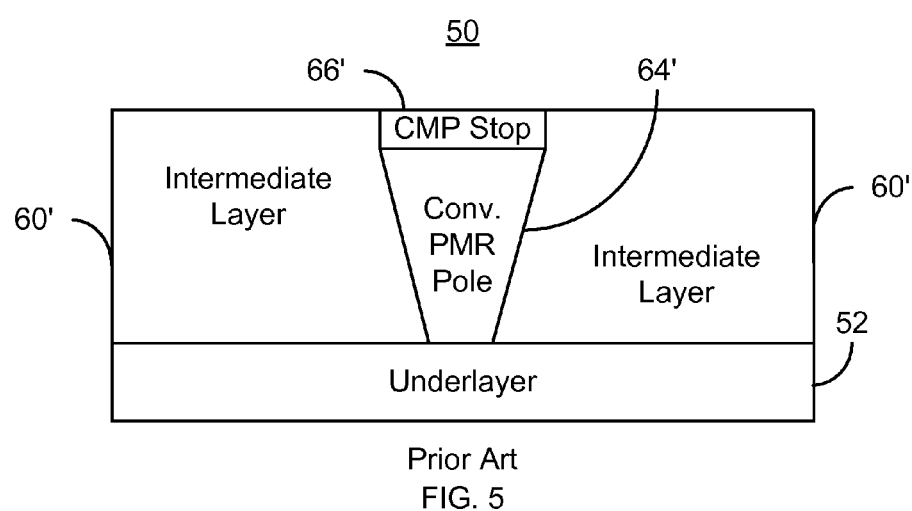
Figure 6:
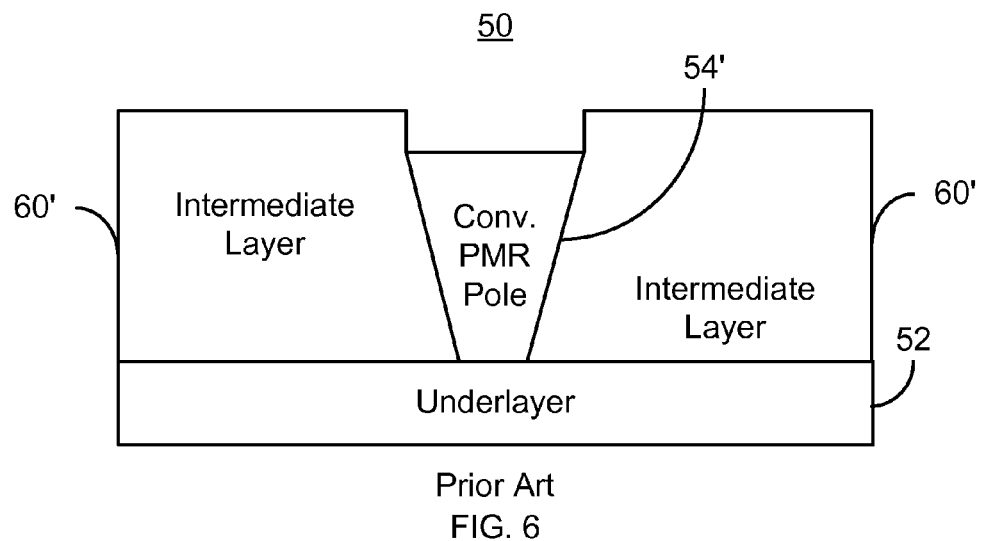
Figure 7:
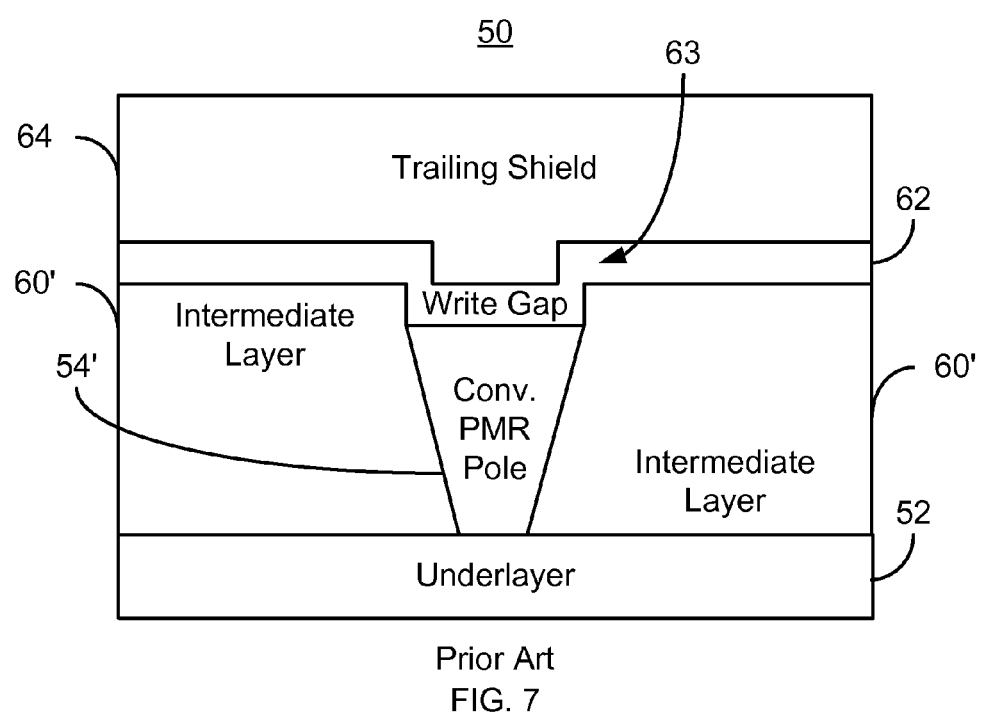
Figure 8:
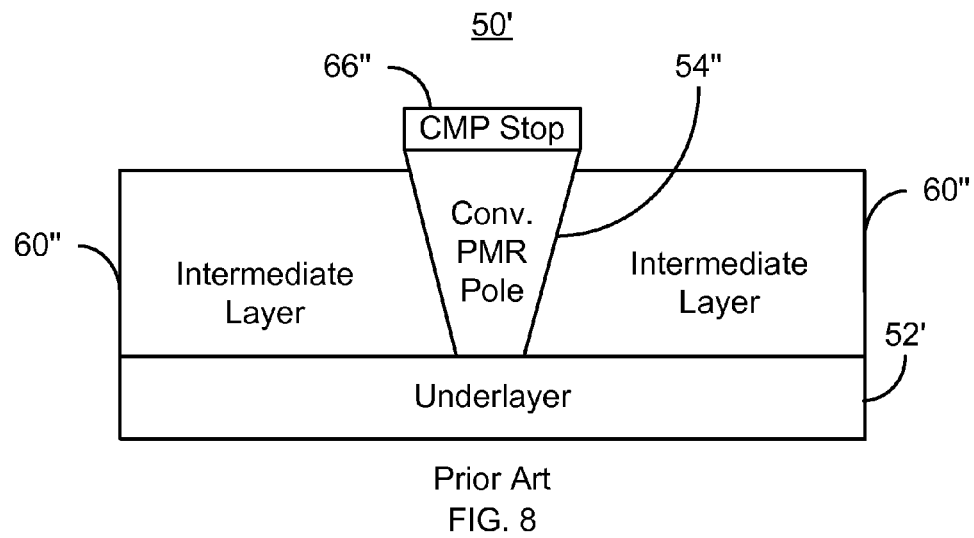
FIGS. 8-9 are diagram depicting another conventional PMR transducer during fabrication.
Figure 9:
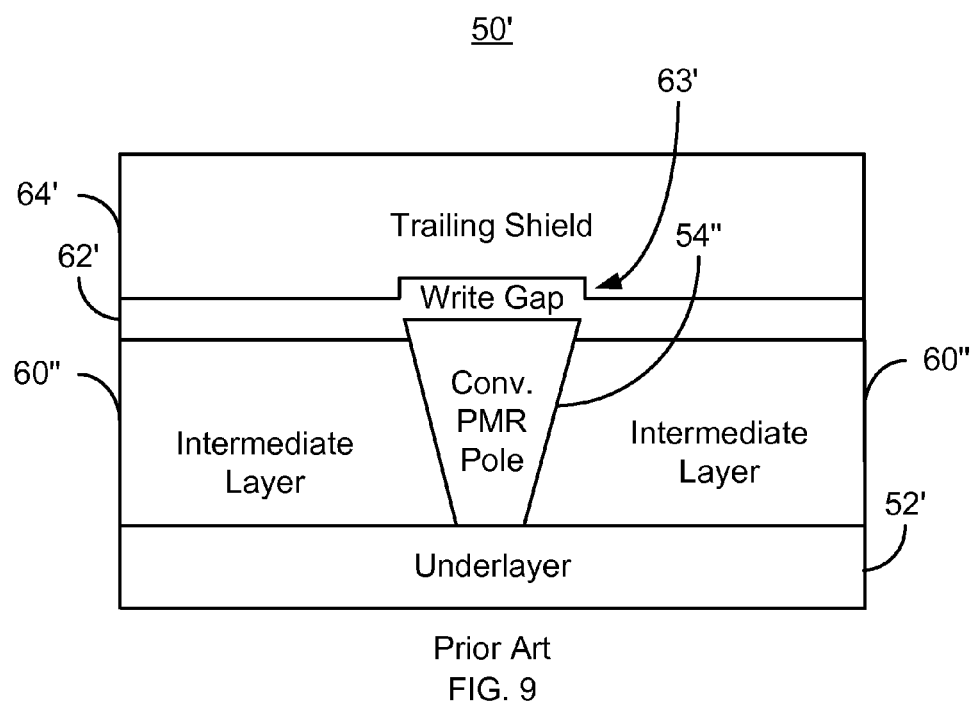
Figure 10:
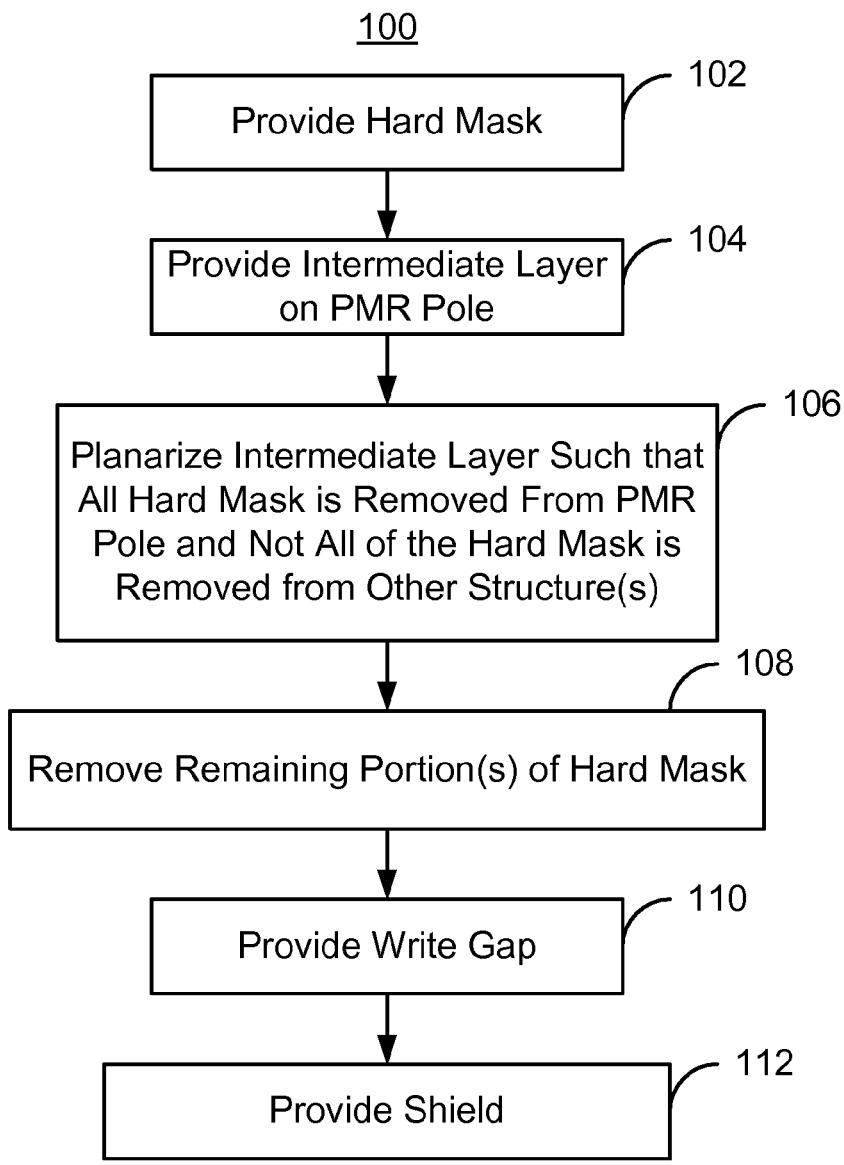
FIG. 10 is a flow chart depicting an exemplary embodiment of a method for fabricating a PMR transducer.

FIG. 10 is a flow chart depicting an exemplary embodiment of a method 100 for fabricating a PMR transducer. For simplicity, some steps may be omitted. The PMR transducer being fabricated may be part of a merged head that also includes a read head (not shown) and resides on a slider (not shown). The method 100 also may commence after formation of other portions of the PMR transducer. The method 100 is also described in the context of providing a single PMR transducer. However, the method 100 may be used to fabricate multiple transducers at substantially the same time.

The method 100 commences after formation of the PMR pole layers. In one embodiment, the method might commence after the PMR pole is formed. However, in another embodiment, the PMR pole is formed using the method 100.

A hard mask is provided, via step 102. One portion of the hard mask resides on the PMR pole, while a second portion of the hard mask resides on another structure. For example, in one embodiment, the second portion of the hard mask may be on the yoke, an anchor structure used during fabrication of the PMR head, another structure, or some combination thereof. In one embodiment, the hard mask is used to define the PMR pole. In addition, in one embodiment, a planarization stop layer, such as DLC, resides between the PMR pole and the hard mask. An intermediate layer is provided on the PMR pole and hard mask, via step 104. Thus, the intermediate layer surrounds at least the PMR pole. In one embodiment, the intermediate layer includes aluminum oxide.

A planarization is performed on the PMR transducer, via step 106. In one embodiment, the planarization includes a CMP process. The planarization thus removes at least a portion of the intermediate layer. The planarization is also performed such that the portion of the hard mask on the PMR pole is removed without completely removing the other portion of the hard mask on certain other structure(s). For example, the planarization may be performed such that at least some portion of the hard mask residing on an anchor structure and/or a yoke may remain.

In one embodiment, the planarization in step 106 is performed based on a thickness measurement. For example, the PMR pole has a top surface and the intermediate layer has an as-deposited top surface. When the planarization commences, the top surface of the PMR pole is lower than the as-deposited top surface of the intermediate layer. Thickness measurement(s) may be performed on the intermediate layer distal from the PMR pole during the planarization. In one embodiment, the thickness measurement may be performed using optical techniques. Thus, an intermediate layer thickness is determined during planarization. The planarization may be ended when the thickness of the intermediate layer indicates that an exposed surface of the intermediate layer is lower than the as-deposited top surface (before planarization) and higher than the PMR pole top surface. Thus, all of the hard mask on the PMR pole should have been removed. However, some portion of the hard mask on other structures may remain.

In addition, a notch in a shield may be present in the completed PMR transducer. The planarization performed in step 106 may be based on the desired height of the notch. In particular, if a thinner notch is desired, the planarization in step 106 is used to remove a greater portion of the intermediate layer. If a thicker notch is desired, less of the intermediate layer may be removed in step 106.

The remaining portion of the hard mask on the other structure(s) is removed, via step 108. In one embodiment, step 108 is performed using an ion mill. In addition to removing the hard mask, the ion mill performed in step 108 may also remove a portion of the intermediate layer. However, in one embodiment, the intermediate layer has a significantly lower selectivity for removal by the process used in step 108. In one embodiment, the ion mill performed in step 108 may also be used to tune the height of the notch. If a thinner notch is desired, the removal/ion mill in step 108 is used to remove a greater portion of the intermediate layer. If a thicker notch is desired, less of the intermediate layer may be removed in step 108. In addition, the any remaining planarization stop layer may be removed.

Step 108 may be performed in a variety of ways. In one embodiment, a mask is utilized. In such an embodiment, a mask may be formed on the PMR pole after the planarization has been performed in step 106. The mask thus protects the PMR pole region from which the hard mask was removed. Step 108 may then be performed while the mask is in place. Thus, the remaining part of the hard mask on the other structures may be removed without damage to the PMR pole region. The mask may then be removed before the write gap is provided. In another embodiment, the removal of the remaining portions of the hard mask in step 108 may be accomplished without the use of a mask. In such a case, the ion mill or other process used in step 108 may be controlled so that damage to the PMR pole region is reduced or avoided.

A write gap is provided on the PMR pole, via step 110. The shield is provided on the write gap, via step 112.

Using the method 100, a PMR transducer may be fabricated. Because removal of the hard mask is controlled in steps 106 and 108, the amount of the intermediate layer removed is better controlled. Thus, the size of the notch in the shield may also be better controlled. For example, in one embodiment, the notch height may be tuned from zero through one hundred nanometers with a sigma of not more than three nanometers. As a result, performance of the PMR transducer may be improved.

Figure 11:
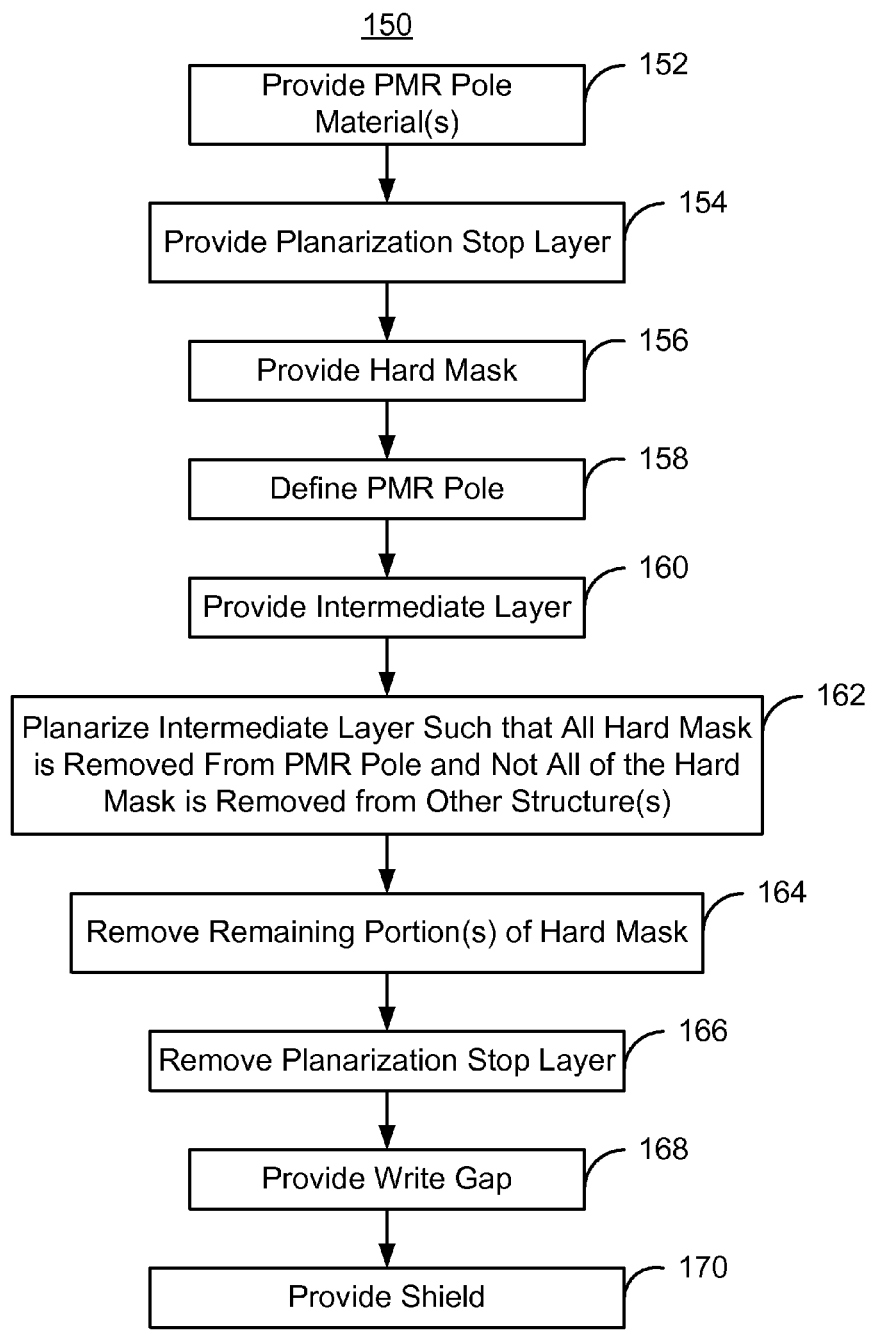
FIG. 11 is a flow chart depicting another embodiment of a method for fabricating a PMR head.

FIG. 11 is a flow chart depicting another embodiment of a method 150 for fabricating a PMR transducer. For simplicity, some steps may be omitted. FIGS. 12-19 are diagrams depicting an exemplary embodiment of a PMR transducer 200 during fabrication. The PMR transducer being fabricated may be part of a merged head that also includes a read head (not shown) and resides on a slider (not shown). The method 150 also may commence after formation of other portions of the PMR transducer 200. The method 150 is also described in the context of providing a single PMR transducer. However, the method 150 may be used to fabricate multiple transducers at substantially the same time.

The material(s) for the PMR pole are provided, via step 152. Step 152 may include forming seed layer(s) as well as depositing layer(s) at least some of which contain magnetic materials. A planarization stop layer is provided, via step 154. The stop layer may be a CMP stop layer. In one embodiment, step 154 includes providing a DLC layer.

A hard mask is provided, via step 156. A portion of the hard mask covers the portion of the pole layers from which the PMR pole is formed. Thus, this portion of the hard mask may be considered to reside on the PMR pole. Although the region surrounding the PMR pole is exposed, other portions of the PMR head may be covered by the hard mask. For example, structures such as the yoke and anchor structure used during fabrication may be covered by the hard mask.

Figure 12:
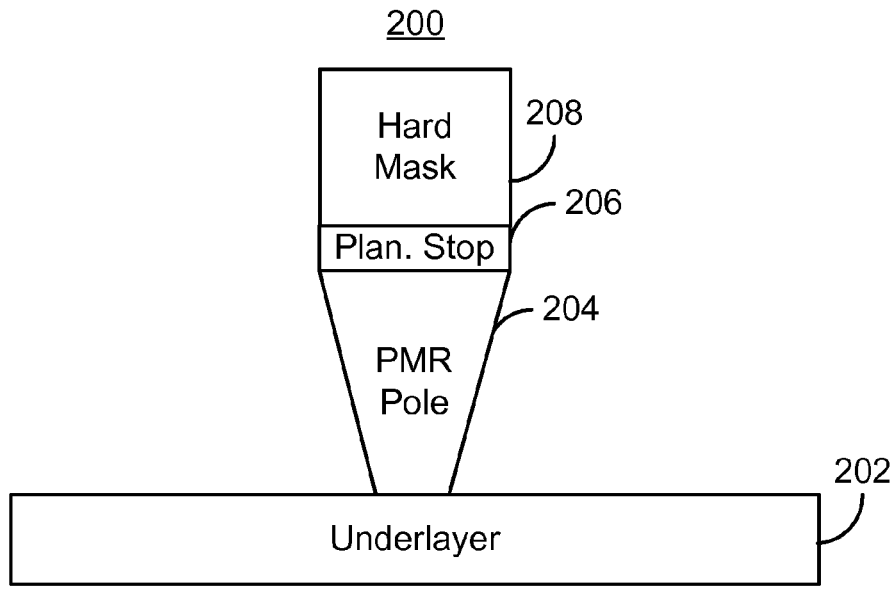
FIGS. 12-19 are diagrams depicting an exemplary embodiment of a perpendicular magnetic recording head during fabrication.
Figure 13:
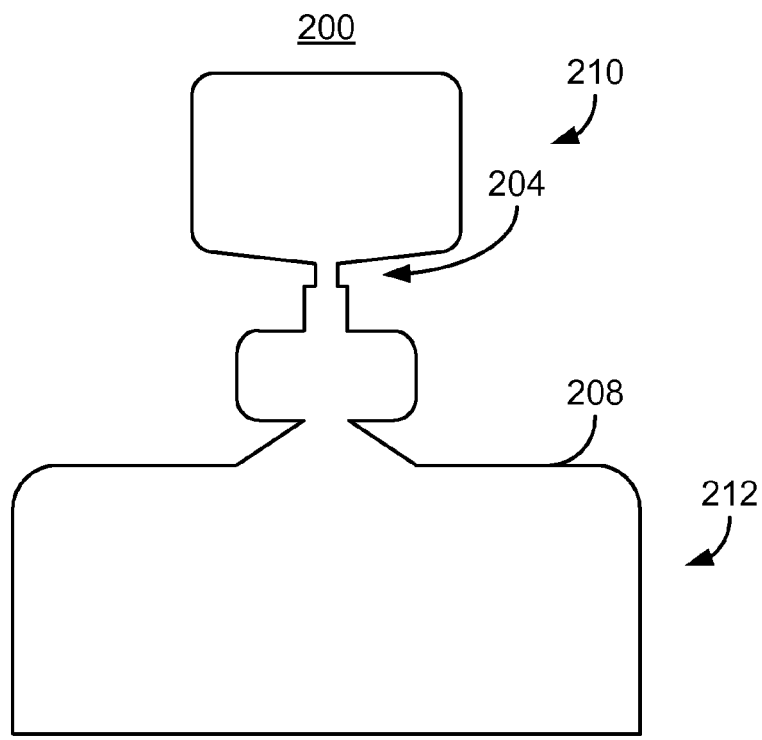

The PMR pole is defined, via step 158. In one embodiment, step 158 includes milling the exposed portion of the PMR pole materials. In addition, a pole trim may be performed. FIGS. 12-13 depict the PMR transducer 200 after step 158 is performed. FIG. 12 depicts an ABS view of the PMR transducer 200, while FIG. 13 depicts a top view of the PMR transducer 200. The PMR transducer 200 includes an underlayer 202, a PMR pole 204, CMP stop layer 206, and hard mask 208. Also shown are yoke structure 210 and anchor structure 212. The hard mask 208 thus exposed portions of the PMR pole materials to the sides of the PMR pole 204, allowing the PMR pole 204 to be defined.

Figure 14:
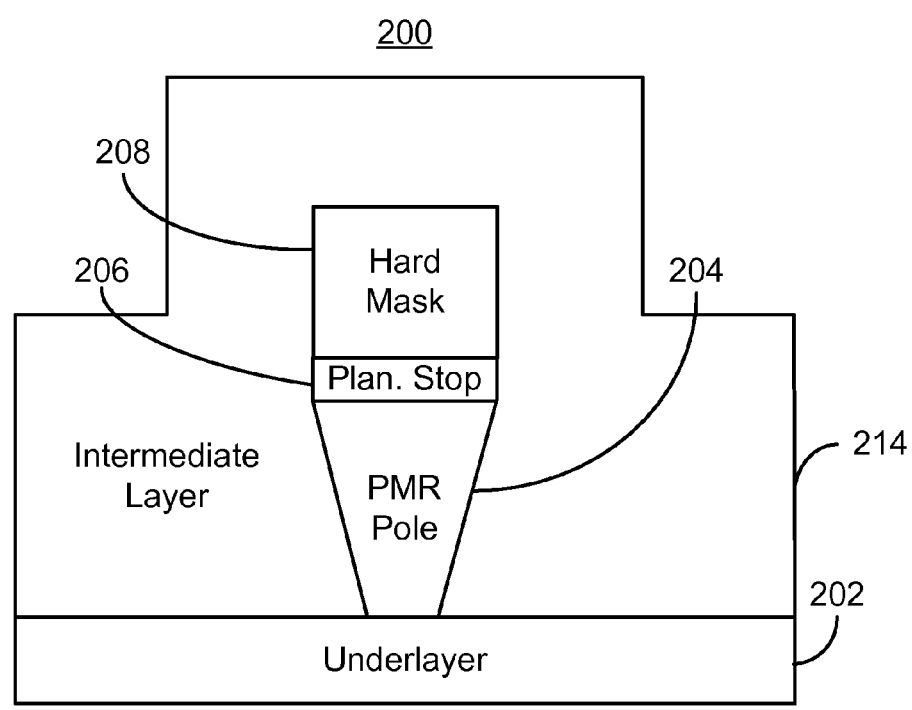

An intermediate layer is provided, via step 160. In one embodiment, step 160 includes blanket depositing the intermediate layer. Thus, at least the PMR pole 204, as well as the planarization stop layer 206, are covered by the intermediate layer. In one embodiment, the intermediate layer includes aluminum oxide. FIG. 14 depicts the PMR transducer 200 after step 160 has been performed. Thus, the intermediate layer 214 has been formed.

Figure 15:
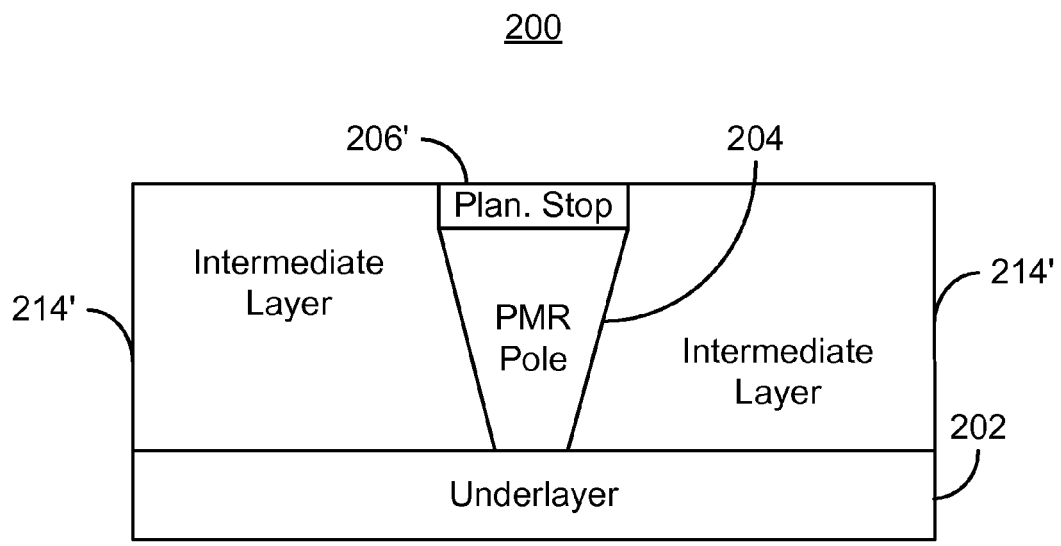
Figure 16:
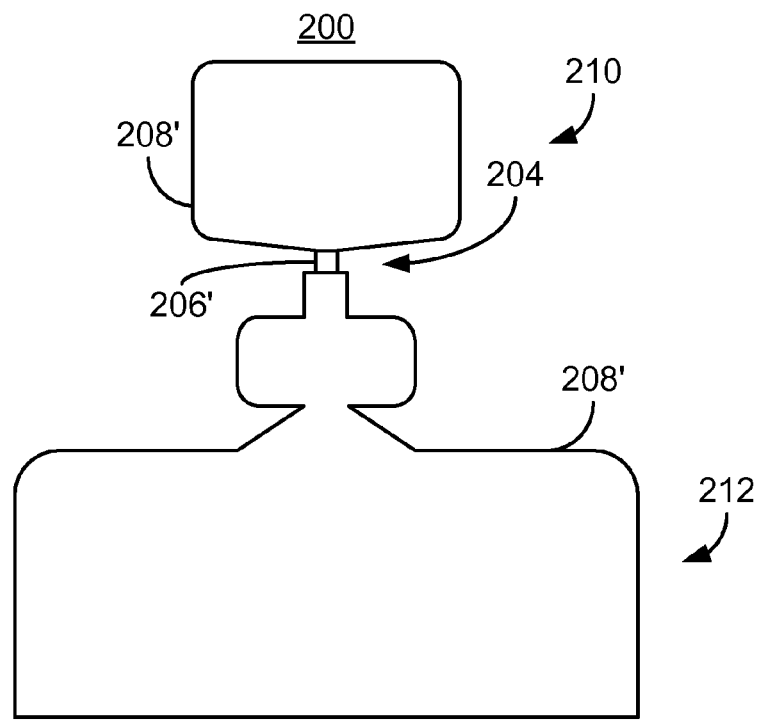

A planarization is performed to remove the hard mask 208 from the PMR pole 204, via step 162. However, in step 162, the hard mask 208 is not removed from at least some of the remaining structures of the PMR transducer 200. For example, in one embodiment, the hard mask 208 remains on the yoke 210 and/or and anchor structure 212. FIGS. 15-16 depict the PMR transducer 200 after step 162 is performed. FIG. 15 depicts the PMR transducer 200 from the ABS, while FIG. 16 is a top view of the PMR transducer 200. A substantially planar surface formed by the top of the remaining portion of the intermediate layer 214' and the remaining portion of the CMP stop layer 206'. In one embodiment, the CMP stop layer 206' is intact. However, in another embodiment, a portion of the CMP stop layer 206' has been removed. Step 162 has removed the portion of the hard mask 208 above the PMR pole 204, exposing the CMP stop layer 206'. Although some of it may have been removed, some hard mask 208' remains on other structures such as the yoke 210 and/or anchor 212.

In one embodiment, the planarization in step 162 is performed based on a thickness measurement. For example, the PMR pole 204 has a PMR pole top surface. When the planarization commences, the PMR pole top surface is lower than the as-deposited top surface. Thickness measurement(s) may be performed on the intermediate layer 214' distal from the PMR pole during the planarization in step 162. In one embodiment, the thickness measurement may be performed using optical techniques. The planarization may be ended when the thickness of the intermediate layer 214' indicates that an exposed surface of the intermediate layer is lower than the as-deposited top surface and higher than the PMR pole top surface. All of the hard mask on the PMR pole 204 should have been removed. However, some portion of the hard mask 208' on other structures may remain. Thus, the CMP stop layer 206' is exposed while other structures such as the yoke 210 and/or anchor 212 may still be covered by the hard mask 208'.

Figure 17:
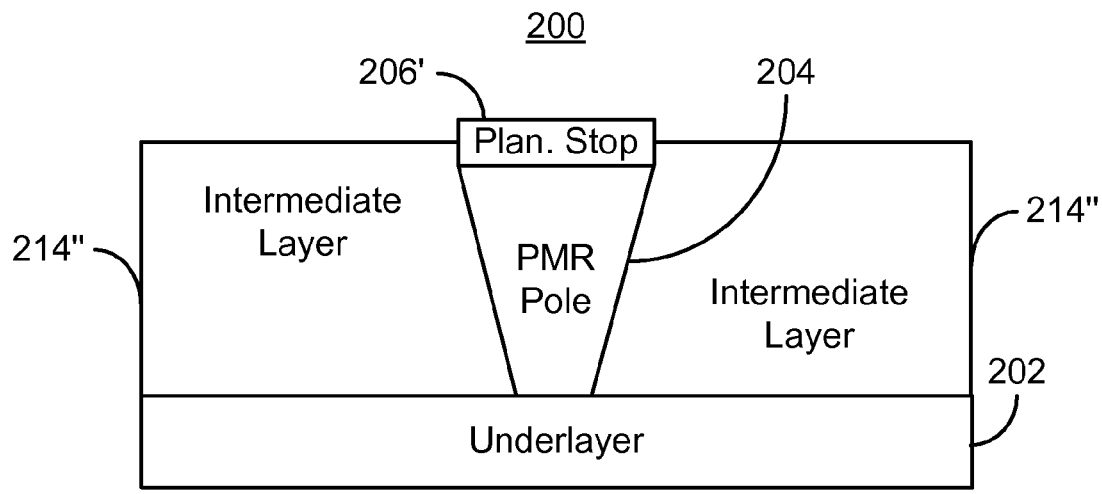

The remaining portion of the hard mask 208' is removed, via step 164. In one embodiment, step 164 is performed using an ion mill. In another embodiment, another process may be used for removing the planarization stop layer 206'. Although the intermediate layer 214' may have a significantly lower selectivity for removal by the process used in step 164, the removal in step 164 may also remove a portion of the intermediate layer 214'. In one embodiment, the ion mill performed in step 164 may also be used to tune the height of a notch in the shield by tuning the height of the intermediate layer 214'. If a thinner notch is desired, the removal/ion mill in step 164 is used to remove a greater portion of the intermediate layer 214'. If a thicker notch is desired, less of the intermediate layer 214' may be removed in step 164. FIG. 17 depicts one embodiment of the PMR head 200 after step 164 is performed. Thus, intermediate layer 214" remains. The top surface of the intermediate layer 214" is below the top of the planarization stop layer 206', but above the top surface of the PMR pole 204.

Furthermore, step 164 may be performed in a variety of ways. In one embodiment, a mask is utilized. In such an embodiment, a mask may be formed on the PMR pole after the planarization has been performed in step 162. The mask thus protects the PMR pole 204, from which the hard mask was removed. Step 164 may then be performed while the mask is in place. Thus, the remaining part of the hard mask 208' on the other structures may be removed without damage to the PMR pole 204. The mask may then be removed before the write gap is provided. In another embodiment, the removal of the remaining portions of the hard mask 208 in step 164 may be accomplished without the use of a mask. In such a case, the ion mill or other process used in step 164 may be controlled so that damage to the PMR pole region is reduced or avoided.

Figure 18:
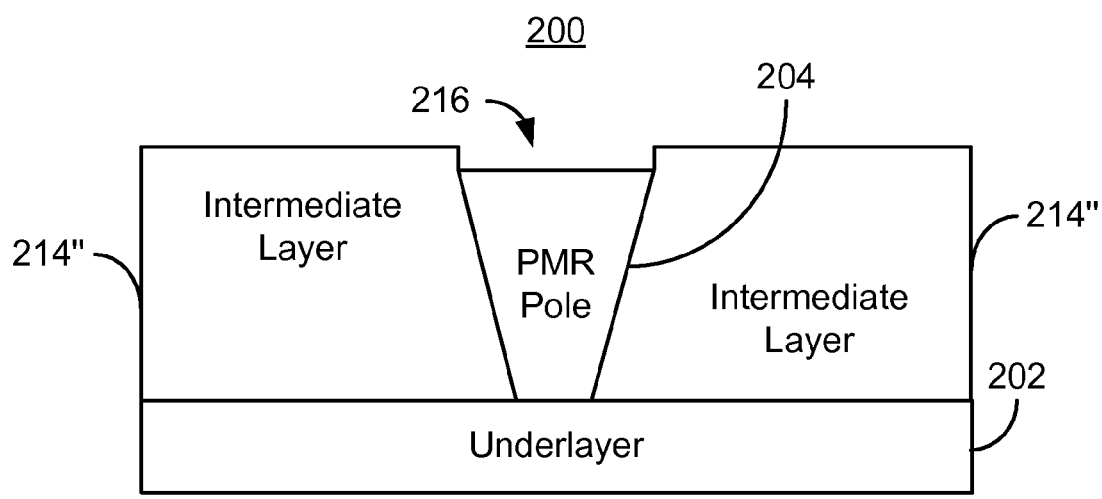

Any remaining portion of the planarization stop layer may also be removed, via step 166. FIG. 18 depicts the PMR transducer 200 after step 168 is performed. Thus, trench 216 is shown in place of the planarization stop layer 206'.

Figure 19:
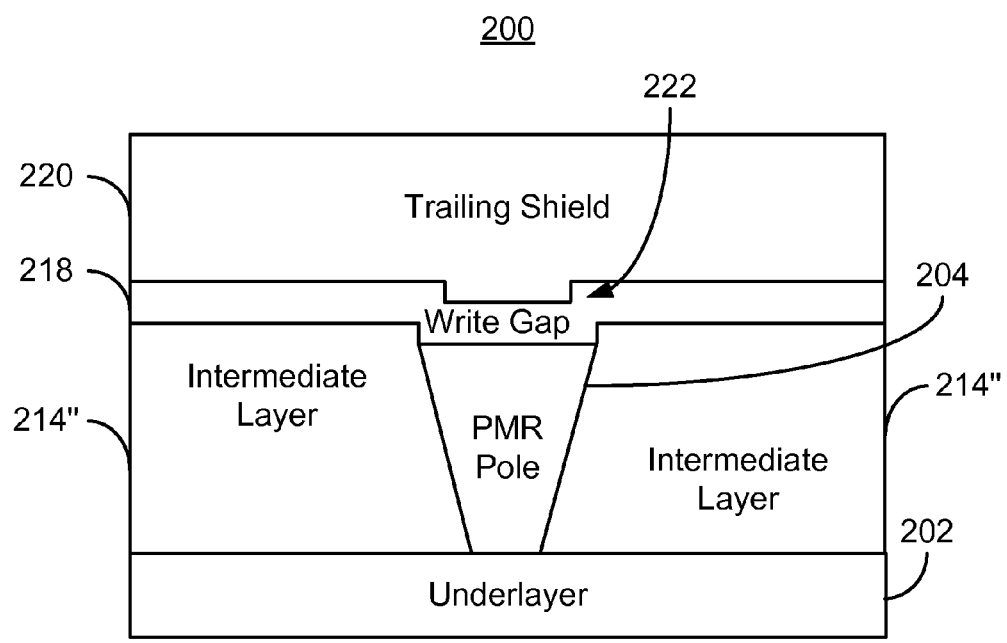

A write gap is provided on the PMR pole, via step 168. The shield is provided on the write gap, via step 170. FIG. 19 depicts the transducer 200 after step 170 is performed. Thus, the write gap 218 and trailing shield 220 are shown. Also shown is a notch 222 in the shield 220 due to the topology of the PMR transducer 200, including the trench 216.

The notch 222 may be configured using the planarization in step 162 as well as the removal of the hard mask in step 164. Thus, the planarization performed in step 162 may also be based on the desired height of the notch. In particular, if a thinner notch is desired, the planarization in step 162 is used to remove a greater portion of the intermediate layer 214. If a thicker notch is desired, less of the intermediate layer 214 may be removed in step 162. Similarly, if a thinner notch is desired, the hard mask 208' removal in step 164 is used to remove a greater portion of the intermediate layer 214. If a thicker notch is desired, less of the intermediate layer 214 may be removed in step 164. Thus, using steps 162 and 164, the notch 222 may be controlled.

Using the methods 100 and/or 150, a PMR transducer 200 may be fabricated. Because removal of the hard mask is controlled in the planarization step 106/162 and hard mask removal step 108/164, the amount of the intermediate layer 214 removed is better controlled. Thus, the size of the notch 22 in the shield 220 may also be better controlled. For example, in one embodiment, the notch height may be tuned from zero through one hundred nanometers with a sigma of not more than three nanometers. As a result, performance of the PMR transducer may be improved.

We claim:

1. A method for providing a perpendicular magnetic recording (PMR) transducer including a PMR pole and a yoke structure coupled with the PMR pole, the method comprising;
   providing a hard mask, a first portion of the hard mask residing on the PMR pole, a second portion of the hard mask residing on an other structure;
   providing an intermediate layer, the intermediate layer surrounding at least the PMR pole;
   performing a planarization on at least the intermediate layer to remove the first portion of the hard mask residing on the PMR pole without completely removing the second portion of the hard mask on the other structure;
   removing a remaining portion of the hard mask on the other structure, the removing the remaining portion of the hard mask further comprising performing an ion mill;
   providing a write gap on the PMR pole; and
   providing a shield on the write gap.

2. The method of claim 1 wherein the other structure includes the yoke structure.

3. The method of claim 1 wherein the other structure includes an anchor structure.

4. The method of claim 1 wherein the shield includes a notch having a height, the notch residing substantially above the PMR pole and wherein the planarization removes a portion of the intermediate layer having a thickness based on the height of the notch.

5. The method of claim 1 further comprising:
   providing a planarization stop layer, at least a portion of the planarization stop layer residing on the PMR pole and under the first portion of the hard mask.

6. The method of claim 5 further comprising:
   removing the at least the portion of the planarization stop layer after the planarization has been performed.

7. The method of claim 3 wherein the planarization stop layer includes diamond-like carbon.

8. The method of claim 1 further comprising:
   providing a planarization stop layer, at least a portion of the planarization stop layer residing on the PMR pole and under the first portion of the hard mask; and
   removing a remaining portion of the planarization stop layer after the remaining portion of the hard mask is removed.

9. A method for providing a perpendicular magnetic recording (PMR) transducer including a PMR pole and a yoke structure coupled with the PMR pole, the method comprising;
   providing a hard mask, a first portion of the hard mask residing on the PMR pole, a second portion of the hard mask residing on an other structure;
   providing an intermediate layer, the intermediate layer surrounding at least the PMR pole;
   performing a planarization on at least the intermediate layer to remove the first portion of the hard mask residing on the PMR pole without completely removing the second portion of the hard mask on the other structure;
   removing a remaining portion of the hard mask on the other structure, wherein the shield includes a notch having a height, the notch residing substantially above the PMR pole, the removing the remaining portion of the hard mask further comprising performing an ion mill having a duration based on the height, the ion mill removing the remaining portion of the hard mask and a portion of the intermediate layer;
   providing a write gap on the PMR pole; and
   providing a shield on the write gap.

10. A method for providing a perpendicular magnetic recording (PMR) transducer including a PMR pole and a yoke structure coupled with the PMR pole, the method comprising;
   providing a hard mask, a first portion of the hard mask residing on the PMR pole, a second portion of the hard mask residing on an other structure;
   providing an intermediate layer, the intermediate layer surrounding at least the PMR pole;
   performing a planarization on at least the intermediate layer to remove the first portion of the hard mask residing on the PMR pole without completely removing the second portion of the hard mask on the other structure;
   removing a remaining portion of the hard mask on the other structure;
   providing a write gap on the PMR pole;
   providing a shield on the write gap;
   wherein the shield includes a notch having a height, the notch residing substantially above the PMR pole and wherein the planarization removes a portion of the intermediate layer having a thickness based on the height of the notch; and
   wherein the PMR pole has a PMR pole top surface and wherein the intermediate layer has an as-deposited top surface, the performing the planarization further comprising:
   performing a thickness measurement on the intermediate layer distal from the PMR pole to determine an intermediate layer thickness; and
   ending the planarization when the intermediate thickness corresponds to an exposed surface of the intermediate layer being lower than the as-deposited top surface and higher than the PMR pole top surface.

11. The method of claim 10 wherein the intermediate layer includes aluminum oxide.

12. The method of claim 10 wherein the performing the thickness measurement further includes performing an optical measurement.

13. A method for providing a perpendicular magnetic recording (PMR) transducer including a PMR pole and a yoke structure coupled with the PMR pole, the method comprising;
   providing a hard mask, a first portion of the hard mask residing on the PMR pole, a second portion of the hard mask residing on an other structure;
   providing an intermediate layer, the intermediate layer surrounding at least the PMR pole;
   performing a planarization on at least the intermediate layer to remove the first portion of the hard mask residing on the PMR pole without completely removing the second portion of the hard mask on the other structure;
   providing a mask on the PMR pole after the planarization has been performed and before a write gap is provided
   removing a remaining portion of the hard mask on the other structure;
   wherein the removing the remaining part of the hard mask further includes removing the remaining part of the hard mask on the yoke structure after the mask is provided;
   removing the mask before the write gap is provided and after the remaining part of the hard mask is removed;
   providing the write gap on the PMR pole; and
   providing a shield on the write gap.

14. A method for providing a perpendicular magnetic recording (PMR) transducer including a PMR pole and a yoke structure coupled with the PMR pole, the method comprising;
- providing a planarization stop layer, at least a portion of the planarization stop layer residing on the PMR pole;
- providing a hard mask, a first portion of the hard mask residing on the PMR pole, a second portion of the hard mask residing on the yoke structure;
- providing an intermediate layer, the intermediate layer surrounding at least the PMR pole;
- performing a planarization on at least the intermediate layer, the planarization removing the first portion of the hard mask residing on the PMR pole without completely removing the second portion of the hard mask on the yoke structure;
- removing a remaining part of the hard mask on the yoke structure;
- removing a remaining portion of the planarization stop layer on the PMR pole after the planarization has been performed, the step of removing the remaining portion of the hard mask further comprising
- providing a mask on the PMR pole after the planarization has been performed and before the remaining part of the hard mask is removed; and
- removing the mask before a write gap is provided;
- providing the write gap on the PMR pole; and
- providing a shield on the write gap;
- wherein the shield includes a notch having a height substantially above the PMR pole.

15. A method for providing a perpendicular magnetic recording (PMR) head comprising:
- providing a PMR transducer including a PMR pole and a yoke structure coupled with the PMR pole, the providing the PMR transducer further including
- providing a planarization stop layer, at least a portion of the planarization stop layer residing on the PMR pole;
- providing a hard mask, a first portion of the hard mask residing on the PMR pole, a second portion of the hard mask residing on the yoke structure;
- providing an intermediate layer, the intermediate layer surrounding at least the PMR pole;
- performing a planarization on at least the intermediate layer, the planarization removing a thickness of the intermediate layer and removing the first portion of the hard mask residing on the PMR pole without completely removing the second portion of the hard mask on the yoke structure;
- removing a remaining part of the hard mask on the yoke structure;
- removing a remaining portion of the planarization stop layer on the PMR pole after the planarization has been performed;
- providing a write gap on the PMR pole; and
- providing a shield on the write gap;
- wherein the shield includes a notch having a height substantially above the PMR pole, the thickness of the intermediate layer removed in the planarization being based on the height of the notch.

* * * * *